United States Patent [19]

Henry, Jr. et al.

[11] 4,375,518

[45] Mar. 1, 1983

[54] RESINOUS PETROLEUM RESIDUE REFRACTORY BINDERS

[75] Inventors: Francis W. Henry, Jr., Glen Burnie; Merrill Wood, Jr., Baltimore, both of Md.

[73] Assignee: General Refractories Co., Bala Cynwyd, Pa.

[21] Appl. No.: 248,577

[22] Filed: Mar. 27, 1981

[51] Int. Cl.$^3$ ............................................. C04B 35/52
[52] U.S. Cl. ....................................... 501/99; 501/109
[58] Field of Search ................... 501/99, 109; 208/22, 208/41

[56] References Cited

U.S. PATENT DOCUMENTS

| | | | |
|---|---|---|---|
| 2,991,241 | 7/1961 | Renner | 208/22 |
| 3,318,801 | 5/1967 | Alexander et al. | 208/22 |
| 3,355,377 | 11/1967 | King | 208/22 |
| 3,372,045 | 3/1968 | Baum et al. | 208/41 |
| 4,022,739 | 5/1977 | Bove | 260/28.5 C |
| 4,261,878 | 4/1981 | Hirose et al. | 260/38 |

FOREIGN PATENT DOCUMENTS 1511521 of 1898 United Kingdom ................ 501/102

*Primary Examiner*—James Poer
*Attorney, Agent, or Firm*—Finnegan, Henderson, Farabow, Garrett & Dunner

[57] ABSTRACT

A non-aqueous, thermoplastic refractory binder comprising a resinous petroleum residue having a softening point ranging from 100° F. to 150° F. (38°–65° C.), being less than 2% insoluble in benzene, and preferably having a fixed carbon content of between 30 and 40%, and refractories made therewith.

13 Claims, No Drawings

RESINOUS PETROLEUM RESIDUE REFRACTORY BINDERS

BACKGROUND OF THE INVENTION

The present invention relates to binder materials for particulate refractories and specifically non-aqueous thermoplastic binders.

A commonly used non-aqueous thermoplastic binder material for refractories is coal tar. Advantages in using coal tar for this purpose are its low price and the fact that it is easy to work with. However, a disadvantage associated with using coal tar as the binder material for a refractory is that when the refractory is subsequently heated, fumes are generated. Such fumes have been shown to be both toxic and carcinogenic.

SUMMARY OF THE INVENTION

It is, therefore, a main object of the present invention to provide a non-aqueous, thermoplastic binder material for refractories which overcomes the above-mentioned drawback.

It is a more specific object of the present invention to provide a non-aqueous thermoplastic binder material for refractories which is less toxic when compared to coal tar.

A further object of this invention is to provide a non-aqueous thermoplastic binder material for refractories which is less carcinogenic when compared to coal tar.

A still further object of this invention is to provide a non-aqueous thermoplastic binder material for refractories which is low in cost.

Another object of this invention is to provide a non-aqueous thermoplastic binder material for refractories which is easy to work with.

Additional objects and advantages of the invention will be set forth in part in the description which follows, and in part will be obvious from the description, or may be learned by practice of the invention. The objects and advantages of the invention may be realized and attained by means of instrumentalities and combinations particularly pointed out in the appended claims.

To achieve the objects and in accordance with the purpose of the invention, as embodied and broadly described herein, the invention comprises a refractory comprising a refractory material and a non-aqueous thermoplastic binder, said binder being a resinous petroleum residue having a softening point ranging from 100° F. to 150° F. (38°-65° C.), and being less than 2% insoluble in benzene.

The foregoing and other objects, features, and advantages of the present invention will be made more apparent from the following description of the preferred embodiments.

DESCRIPTION OF THE PREFERRED EMBODIMENTS

Reference will now be made in detail to the present preferred embodiments of the invention.

A non-aqueous thermoplastic binder material for refractories in accordance with the present invention comprises resinous petroleum residue having a softening point ranging from 100° F. to 150° F. (38°-65° C.), and being less than 2% insoluble in benzene.

In a preferred embodiment, the resinous petroleum residue binder has a fixed carbon content of between 30 and 40%. Where necessary, the fixed carbon content may be increased by addition of a carbon additive to the refractory mix. Preferably the carbon additive should not exceed 3% by weight of the refractory mix.

The term "resinous petroleum residue" as above employed, refers to that which is remaining after a feedstock, such as gas field condensates, naptha, or kerosene, is steam or catalytically cracked to produce ethylene, and the light ends boiling below 338° C. are removed. This material is also sometimes called ethylene cracker bottoms. In terms of chemical structure, this material differs from coal tar pitch in that there is more alkylation of the aromatic rings and almost no cresylics and nitrogen base compounds such as pyridines and quinolines.

A refractory in accordance with the present invention comprises a refractory material, and a binder, the binder being a resinous petroleum residue having a softening point ranging from 100° F. to 150° F. (38°-65° C.), and being less than 2% insoluble in benzene.

In a preferred embodiment, the resinous petroleum residue binder has a fixed carbon content of between 30 and 40%. Where necessary, the fixed carbon content may be increased by addition of a carbon additive to the refractory mix. Preferably the carbon additive should not exceed 3% by weight of the refractory mix.

The refractory material and binder can be mixed hot or cold. Preferably, the viscosity of the binder is adjusted by use of a viscosity adjusting agent.

Many solvents can be used as viscosity adjusting agents. However, it is preferable that the viscosity adjusting agent is an aromatic solvent. Examples of suitable aromatic solvents for use as viscosity adjusting agents in accordance with the present invention include: aromatic petroleum oil, xylene bottoms, styrene monomers, and styrene bottoms. Mixing of the resinous petroleum residue binder and the viscosity adjusting agent to achieve a suitable viscosity may be carried out either hot or cold.

A satisfactory viscosity for the resinous petroleum residue binder of the present invention at 60° C. is from 0.300 to 0.500 Pa.s. As a general rule, the higher the softening point of the resinous petroleum residue binder the more solvent is required to achieve a suitable viscosity. The ability to adjust the solvent content to achieve a suitable viscosity is within the ordinary skill of one in this art.

There are a variety of uses for the resinous petroleum residue binders and refractories made therefrom of the present invention. These binders are especially useful in blast furnace taphole and trough lining mixes. In addition, they can be used in specialty products such as ramming or vibratable mixes for blast furnace troughs or runners. When used in making carbon-bearing brick such as that used for steel making vessels or iron ladles, it is desirable to additionally include a novolak-type phenolic resin, and/or hexamethylene tetramine.

The present invention is illustrated by the following Example:

EXAMPLE I

Starting with a refractory material having the following composition:

| Composition | Weight % |
| --- | --- |
| calcined fireclay | 15 |
| raw ball clay | 27 |
| coke breeze | 25 |

-continued

| Composition | Weight % |
| --- | --- |
| sand | 13 |
| other | 20 |

1.5% by weight of a carbon additive, and between 21 and 24% by weight of a resinous petroleum residue solution were added. The resinous petroleum residue solution was prepared from a mixture of resinous petroleum residue of 44° C. softening point, 33.7% fixed carbon, and less than 2% benzene insolubles (Data on benzene insolubles was obtained from the supplier of the resinous petroleum residue.), blended with approximately 21.0–23.0% aromatic petroleum oil to give material of a viscosity of 0.450 Pa.s at 60° C., the solution having 26.6% fixed carbon and less than 10% total distillates at 270° C.

Material of this composition was field tested as a non-aqueous taphole mix at two blast furnaces where successful results were obtained.

It will be apparent to those skilled in the art that various modifications and variations can be made in the present invention without departing from the scope or spirit of the invention. Thus, it is intended that the present invention cover the modifications and variations of this invention provided that they come within the scope of the appended claims and their equivalents.

What is claimed is:

1. A refractory comprising a refractory material and a binder, said binder being a resinous petroleum residue having a softening point ranging from 100° F. to 150° F. (38°–65° C.), and being less than 2% insoluble in benzene.

2. The refractory of claim 1 wherein said resinous petroleum residue has a fixed carbon content of between 30 and 40%.

3. The refractory of claim 1 which also includes a viscosity adjusting agent.

4. The refractory of claim 3 wherein said viscosity adjusting agent is an aromatic solvent.

5. The refractory of claim 4 wherein said aromatic solvent is selected from the group: aromatic petroleum oil, xylene bottoms, styrene monomer, and styrene bottoms.

6. The refractory of claim 3 wherein said resinous petroleum residue and said viscosity adjusting agent together comprise between 21 and 24% by weight of said refractory material.

7. The refractory of claim 1 which also includes a carbon additive, said carbon additive not exceeding 3% by weight of said refractory material.

8. The refractory of claim 1 which also includes a novolak-type phenolic resin.

9. The refractory of claim 1 which also includes hexamethylene tetramine.

10. A blast furnace taphole made from the refractory of any of claims 1–7.

11. A trough lining made from the refractory of any of claims 1–7.

12. Ramming or vibratable mixes for blast furnace troughs or runners made with the refractory of any of claims 1–7.

13. Carbon-bearing bricks made from the refractory of either of claims 8–9.

* * * * *